US006888791B1

(12) United States Patent
Ellis et al.

(10) Patent No.: US 6,888,791 B1
(45) Date of Patent: May 3, 2005

(54) SELF-HEALING LINK SWITCHED RING FOR ATM TRAFFIC

(75) Inventors: Donald Russell Ellis, Ottawa (CA); Brent E. Allen, Nepean (CA); David Wright Martin, Nepean (CA); Edward Ryszard Sokolowski, Kanata (CA); Patrick M. McEachern, Nepean (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/467,243

(22) Filed: Dec. 20, 1999

Related U.S. Application Data

(63) Continuation of application No. 08/783,869, filed on Jan. 16, 1997, now Pat. No. 6,256,292.
(60) Provisional application No. 60/021,575, filed on Jul. 11, 1996.

(51) Int. Cl.[7] .............................................. H04L 12/26
(52) U.S. Cl. ........................ 370/227; 370/244; 370/408
(58) Field of Search ................................ 370/216, 217, 370/218, 221, 222, 223, 224, 225, 226, 227, 228, 242, 244, 250, 400, 404, 408, 539, 541

(56) References Cited

U.S. PATENT DOCUMENTS

| | | | | |
|---|---|---|---|---|
| 5,412,652 A | * | 5/1995 | Lu | 370/223 |
| 5,663,949 A | * | 9/1997 | Ishibashi et al. | 370/220 |
| 5,712,846 A | * | 1/1998 | Yoshimura | 370/226 |
| 5,721,727 A | * | 2/1998 | Ashi et al. | 370/244 |
| 5,737,310 A | * | 4/1998 | Goto | 370/222 |
| 5,757,774 A | * | 5/1998 | Oka | 370/242 |
| 5,815,490 A | * | 9/1998 | Lu | 370/223 |
| 5,920,412 A | * | 7/1999 | Chang | 398/83 |

FOREIGN PATENT DOCUMENTS

| | | |
|---|---|---|
| JP | 4-506290 | 10/1992 |
| JP | 5-292040 | 11/1993 |

OTHER PUBLICATIONS

European Patent Office Search Report; Application No. EP 97 11 1631.

(Continued)

*Primary Examiner*—Kwang Bin Yao
(74) *Attorney, Agent, or Firm*—Finnegan, Henderson, Farabow, Garrett & Dunner, L.L.P.

(57) ABSTRACT

The invention provides for a method for transporting a SONET formatted asynchronous transfer mode (ATM) signal and/or a synchronous transfer mode (STM) signal on a line switched ring over a unidirectional path. The SONET formatted ATM signal comprises cells mapped into a STS-Mc or m×STS-1s while the STM signal comprises STS-1s/VTS mapped STS-W. A unidirectional line switched ring is provided for transporting the STM STS-W using a unidirectional path switched protection protocol and the ATM STS-Mc using a unidirectional line switched protection protocol. A ring node comprises input and output ring interfaces, an STS management block, an ATM cell management block, and a non-ATM payload management block. The STS management block routes the traffic to the ATM cell management block and to the non-ATM payload management block, according to the traffic type. The STS management block also provides the UPSR protection for the STS-1s and ULSR protection for the STS-Mc. The ATM cell management block maps the add ATM cells received from the ATM ports into the STS-Mc signal, and delineates the cells from the STS-Mc to present them to the ATM ports. The non-ATM payload management block routes STM VTs or STS-1s to/from the non-ATM ports.

4 Claims, 13 Drawing Sheets

OTHER PUBLICATIONS

Steven H. Hersey and Mark J. Soulliere; "Architectures and Applications of Sonet in a Self–Healing Network"; ICCC'91 International Conference on Communications, vol. 3 of 3; pp. 1418–1424.

J. Vernon Drake; "A Review of the Four Major Sonet/SDH Rings"; ICC '93 Geneva, IEEE International Conference on Communications '93, May 23, 1993, Technical Program, Conference Record, vol. 2/3; pp. 878–884.

Barbara Engel Smith and Clifford Yackle; "SONET Bidirectional Ring Capacity Analysis: A Pragmatic View"; IEEE, May 1, 1994; pp. 489–493.

William Kremer; "SONET Rings and Video: A Perfect Fit"; Telephony/Jan. 23, 1995; pp. 30, 34, 36.

Tsong–Ho Wu, Dennis T. Kong, and Richard C. Lau; "An Economic Feasibility Study for a Broadband Virtual Path SONET/ATM Self–healing Ring"; IEEE Journal on Selected Areas in Communications 10 (1992) Dec., No. 9, New York; pp. 1459–1472.

Tsong–Ho Wu; "Feasibility Study of a High–Speed SONET Self–Healing Ring Architecture in Future Interoffice Networks"; IEEE Communications Magazine 28, (1990) Nov., No. 11, New York; pp. 33–51.

Joseph Sosnosky and Haim Kobrinski; "A Current Bellcore View of Sonet ATM VP Rings"; IEEE; Nov. 14, 1995; pp. 39–44.

Hideo Tatsuno and Nobuyuki Tokura; ATM; "Hitless Path Protection Switching Techniques for ATM Networks"; The Transactions of the Institute of Electronics, Information and Communication Engineers; B–I vol. J 76–B–I; No. 6; pp. 421–430, 455; Jun., 25, 1993.

Yoshio Kajiyama, Nobuyuki Tokura and Katsuaki Kikuchi; "ATM Self–Healing Ring"; Abstract; pp. 639–643.

* cited by examiner

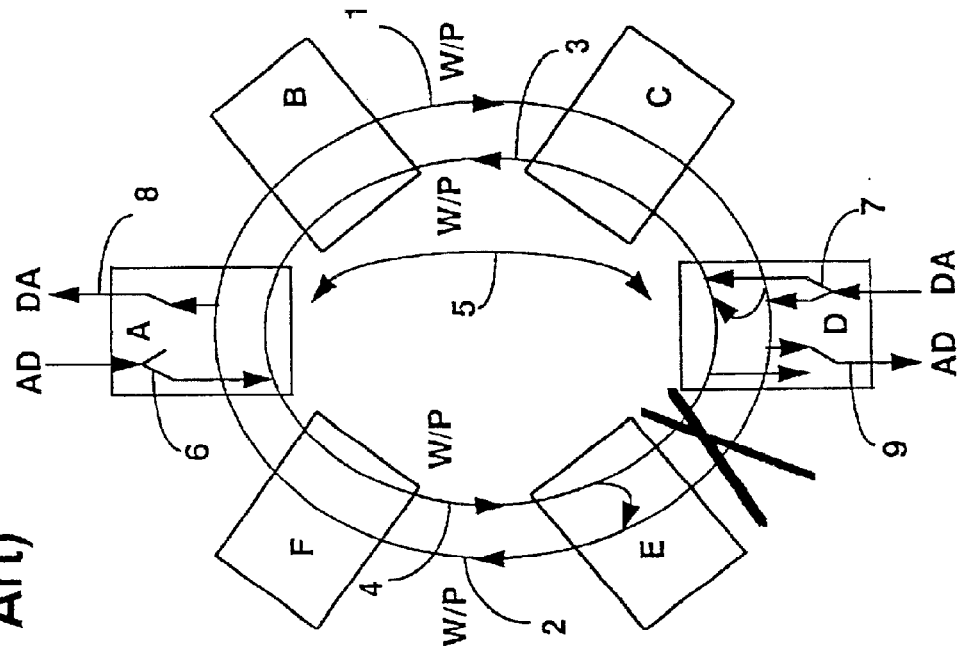
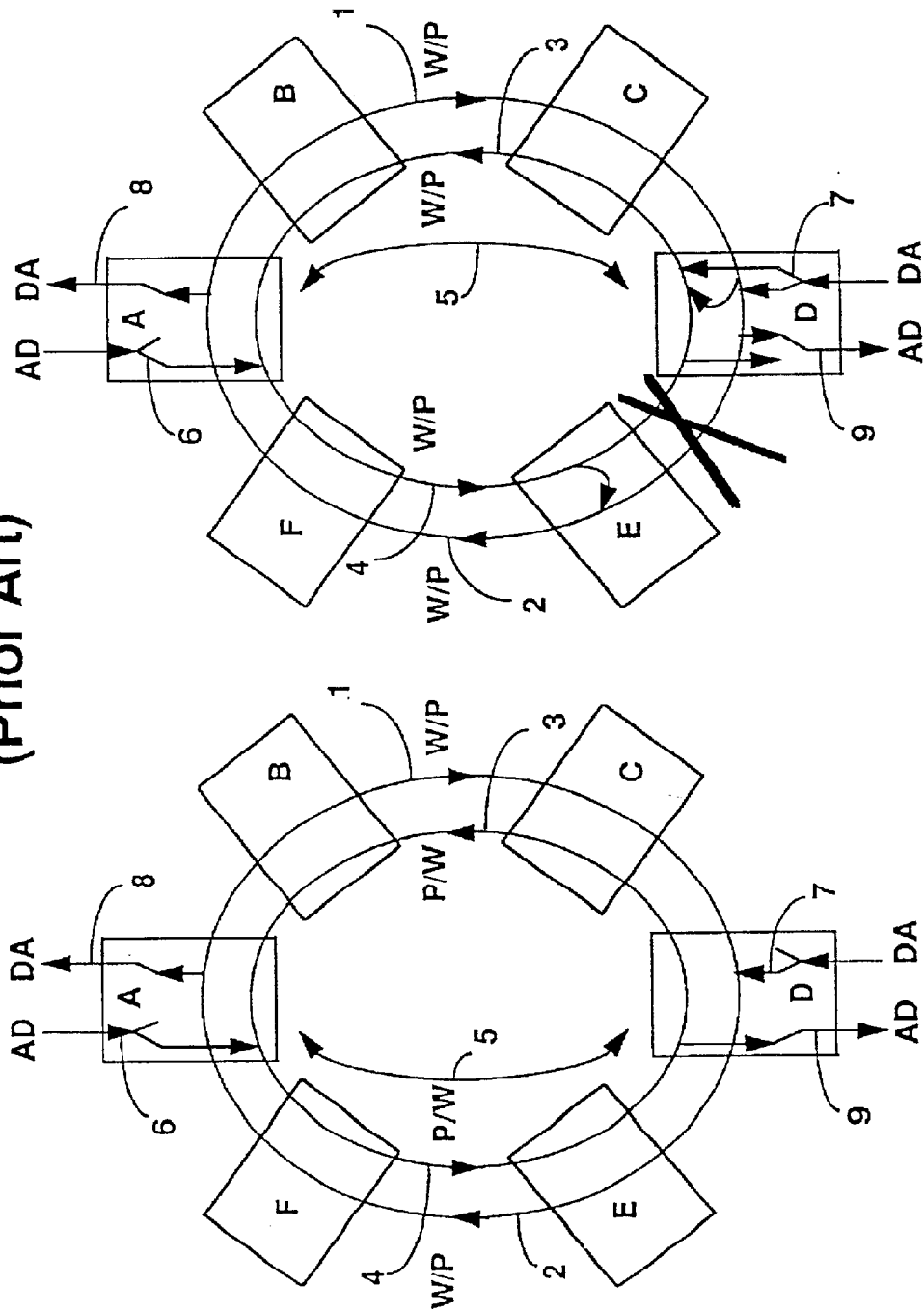
FIGURE 4A (Prior Art)
FIGURE 4B

SELF-HEALING LINK SWITCHED RING FOR ATM TRAFFIC

This is a continuation of application Ser. No. 08/783,869, filed Jan. 16, 1997 now U.S. Pat. No. 6,256,292 which is incorporated herein by reference claims benefit of 60/021,575 filed Jul. 11, 1996.

FIELD OF THE INVENTION

The invention is directed to a line switched ring for carrying asynchronous transfer mode (ATM) traffic or mixed ATM and synchronous transfer mode (STM) traffic for standardized communication of multimedia information, and more particularly to a self-healing line switched ring using a unidirectional path for ATM traffic.

BACKGROUND OF THE INVENTION

The synchronous optical network (SONET) is a standard for a synchronous telecommunication signal used for optical transmission, based on the synchronous digital hierarchy (SDH). SONET is a physical carrier technology, which can provide a transport service for ATM, SMDS, frame relay, T1, E1, etc. As well, SONET provides the ability to combine and consolidate traffic from different locations through one facility (grooming), and reduces the amount of back-to-back multiplexing. More importantly, network providers can reduce the operation cost of their transmission network by using the notably improved operation, administration, maintenance and provisioning (OAM&P) features of SONET.

The SONET standards ANSI T1.105 and Bellcore GR-253-CORE, define the physical interface, optical line rates known as optical carrier (OC) signals, a frame format, and an OAM&P protocol. The user signals are converted into a standard electrical format called the synchronous transport signal (STS), which is the equivalent of the optical signal. The STS-1 frame consists of 90 columns by 9 rows of bytes, the frame length is 125 microseconds. As such, an STS-1 has a bit rate of 51.840 Mb/s. Higher rates (STS-N, STS-Nc) are built from this one, and lower rates are subsets of this. The lower rate components, known as virtual tributaries (VT), allow SONET to transport rates below DS3.

Requests and acknowledgements for protection actions are transmitted in the APS bytes in the SONET overhead, i.e. K1 and K2 bytes. The K1 byte communicates a request for a switch action. The first four bits of K1 indicate the switch request priority and the last four indicate the destination ring node identification (ID). The K2 byte indicates an acknowledgement of the requested protection switch action. The first four bits of K2 indicate the source ring node ID and the last four bits indicate the action taken by that node.

A SONET add/drop multiplexer multiplexes various STS formatted input streams onto optical fiber channels. The STS signals are carried by an optical carrier, which is defined according to the STS that it carries. Thus, an STS-192 signal is carried by an OC-192 optical signal.

The topology of the SONET network can be a linear point-to-point configuration, or a ring configuration.

A linear topology can only protect against single fiber link failures. A "1:1" linear system has an equal number of working and protection links; a "1:N" linear system has N working channels and one shared protection channel.

Lately, rings have become the topology of choice in fiber deployment. The prime motivator for rings versus linear transport is higher survivability. A ring protects against simultaneous failure of the protection and working fibers (i.e. cable cuts) and saves intra-ring and inter-ring pass-through traffic during node failure/isolation. Rings offer cost effective transport while delivering enhanced network survivability.

Currently, two type's of rings are used, namely, unidirectional path switched rings (UPSR), and bidirectional line switched rings (BLSR). The UPSRs are currently used in access networks and therefore they are built for lower rates, such as OC-3, which are sufficient for access link demands. UPSR protection switching is done at the SONET path level. The operation of UPSRs is standardized by the BellCore GR-1400-CORE standard, and there are OC-3/12 rate products available.

The BLSR are currently used in the backbone networks and therefore they are built for higher rates such as OC-48. Switching is done at the SONET line layer. The operation of BLSRs is standardized by the BellCore GR-1230-CORE standard, and there are OC-12/48 rate products available.

The asynchronous transfer mode (ATM) forms the basis for switching in broadband networks. ATM convergence functions permit switching of voice, video and data traffic through the same switching fabric. It multiplexes user information into fixed lengths cells of 53 bytes, with 5 bytes forming a header.

With the constant growing needs for enhanced services in information transmission networks, more efficient transport for bursty traffic carried in ATM cells is needed. There is also a need to simplify and standardize the access link while also obtaining protection of the access traffic. Current practice is to dedicate an entire facility to these new services, such as one STS-1 per customer, where the entire payload is cell based.

While synchronous transfer mode (SIN) access traffic can be advantageously carried on a UPSR, there are disadvantages for ATM traffic. To carry ATM traffic and have the transport vehicle benefit from, and not restrict the bandwidth on demand feature that ATM can provide, the optimum approach is to share a large block of bandwidth between nodes around the ring. In this way, a virtual path (VP) added at a node uses the bandwidth it needs within the large block, rather than using, say, a virtual tributary (VT) where its burst rate will be significantly limited. The shared bandwidth block could be an STS-Nc, where N=1, 3, 6, or higher rates.

This assumes a UPSR with an STS-Nc granularity selector at the tail-ends. With an STS-Nc passing around the UPSR from node to node, the ring bandwidth is quickly exhausted, as each node must source the STS-Nc in different timeslots in order to leave protection timeslots available for other nodes. The UPSR could, in theory, reuse the same working timeslots for the STS-Nc between nodes by operating unprotected and leaving protection to the ATM layer. However, no standardized scheme yet exists at the ATM layer which can provide the 60 ms protection speeds typical of SONET. It is apparent that the two goals of bandwidth efficiency and SONET protection are mutually exclusive in the context of ATM traffic on a UPSR.

A BLSR can carry an STS-Nc node to node in a bandwidth efficient manner. As well, the BLSR can protect any service type since it switches at the line layer. However, the BLSR is not an economical solution for ATM access. This is because for an OC-3 line rate ring, a two-fiber BLSR (2F-BLSR) is not realizable and four-fiber BLSRs (4F-BLSR) are currently not available at the OC-3 rate. An OC-3 4F-BLSR, if it becomes available, would carry twice the bandwidth of an OC-3 UPSR, but almost doubles the cost of the fiber and equipment required, and would therefore be uneconomical for the majority of access applications. Similarly, an OC-12 UPSR or 2F-BLSR, which is typically the next step in upgrading an access applications, carries four times the bandwidth of an OC-3 UPSR, but again, at greater than double the OC-3 cost.

Due to the working timeslot reuse capability, a BLSR always provides the optimum use of bandwidth for a given traffic pattern. However, a complex automatic protection switching (APS) protocol is necessary, which results in longer switching times than for a UPSR. In addition, protection is not optional on a per-path basis. It is also to be noted that for a bidirectional homing traffic pattern typical of the access network, a UPSR is as bandwidth efficient as a BLSR. For a mesh traffic pattern typical of the backbone network, a BLSR is more bandwidth efficient.

In addition, regardless of the line rate or 2F/4F type, a BLSR must perform the ATM add/drop functionality for two bidirectional channels (e.g. east and west). ATM chip sets available today are designed for terminals, or a single bidirectional channel (e.g. east or west). It is expected that the evolution to ATM chips consolidating add/drop functionality for two bidirectional channels will be eventually available, but again at higher costs.

In conclusion, there is no standardized survivable access vehicle currently available which can efficiently carry ATM or mixed ATM/STM traffic.

SUMMARY OF THE INVENTION

The invention provides a novel type of ring for ATM and mixed ATM/non-ATM traffic, employing the UPSR protocol for non-ATM traffic and a new protocol for ATM traffic.

For non-ATM access traffic, the UPSR provides a simple protection protocol, is bandwidth efficient and works well with path based planning tools used in access. Protection can be optional on a per-path basis. In addition, the UPSR has a fast protection time.

For ATM access traffic, none of the existing rings, UPSR or BLSR, satisfies the goals of bandwidth efficiency, SONET protection and economy. The UPSR, predominant in the access network, could carry ATM traffic and be bandwidth efficient but without protection by SONET. If SONET protection is implemented for ATM traffic on the UPSR, bandwidth utilization becomes inefficient. A BLSR could carry ATM traffic, be bandwidth efficient and provide SONET protection. However, the cost of providing such a product is high for an access application. Also, there are no BLSR products possible for 2F or available for 4F at the OC-3 rate, which is currently the predominate rate in the access network.

According to this invention, ATM access traffic is carried over a unidirectional path using a line switched ring. The unidirectional line switched ring (ULSR) of this invention can be implemented at any line rate, including for example an OC-3 line rate, and at costs lower than for BLSR rings. The ULSR provides a unidirectional traffic flow for both ATM and non-ATM traffic, which allows for traffic management and operation commonality. A ULSR is as bandwidth efficient as a BLSR or UPSR for homing traffic. Further, a VP in a ULSR could burst up to the STAN rate, rather than the STS-N/2 limitation with a 2F BLSR.

The ULSR is not currently defined by standards and no SONET products of this type are available.

According to a particular aspect of his invention, a BLSR at a high line rate, such as for example OC-12/48/192, may be used to carry symmetrical ATM traffic in one direction around the ring and, for example, a TV broadcast in the other direction.

It is an object of the present invention to provide a self-healing line switched fiber optic ring to efficiently carry ATM or mixed non-ATM and ATM traffic over a unidirectional path, using SONET technology. The ring is primarily for use in an access network, but it can also be used in a backbone network.

Another object of the invention is to provide a switched ring for carrying ATM traffic with STS-Nc granularity, and non-ATM traffic with VT and/or STS-1 granularity. Thus, the ring of the invention provides a single vehicle for carrying both non-ATM and ATM traffic at all nodes on the ring. Since the ring is unidirectional, like a UPSR, management of the non-ATM traffic would be necessary.

Another object of this invention is to provide a method for using a BLSR or a unidirectional line switched ring (ULSR) for bidirectional traffic via unidirectional transport around the ring. This structure preserves the bidirectional nature of the service at the interfaces, however, it offers cost advantages in the design of the transport layer ring ADMs. The control of the cell add/drop function is implemented such that the cell transport function operates as a physically distributed switch. For an access application with homing traffic, the ring provides the grooming and consolidation of cells between the customer access and the ATM edge switch.

Accordingly, the invention comprises a method for communicating information over a SONET line switched ring having a plurality (K) of communication terminals connected to a first and a second transmission line, comprising the steps of at each terminal (k), inserting an outgoing signal onto the first transmission line along a first direction of transmission defined from the terminal (k), towards an adjacent terminal (k+1), wherein (k) is an integer between 1 and (K) giving the sequential position of the node (k) in the ring; at each the terminal (k), receiving an incoming signal over the first transmission line from an adjacent terminal (k−1), along the first direction of transmission; and operating the plurality of communication terminals according to a unidirectional protection protocol upon detection of a failure condition in the incoming signal.

The invention further comprises a method for transporting a SONET formatted asynchronous transfer mode (ATM) signal on a unidirectional line switched ring comprising the steps of connecting a plurality (K) of nodes in a ring network provided with a working transmission line associated with the first direction of transmission and a protection transmission line associated with a second direction of transmission, opposite to the first direction; detecting at a node (k) an error signal received from a node (k−1) located adjacent to the node (k) and upstream with respect to the first direction; at the node (k), generating a status change request upon receipt of the error signal, and transmitting the status change request on the working and protection transmission line; and restructuring all the nodes of the ring to operate according to one of a working transmission line failure (WTLF), a node failure (NF), a protection transmission line failure (PTLF), and a working and protection transmission line failure (WPTLF) configuration, upon receipt of the status change request.

The invention further comprises a method for communicating information on a bidirectional line switched ring (BLSR) configuration including a plurality (K) of ring nodes connected by a first and a second transmission line, comprising the steps of deploying the BLSR in a homing-type configuration, each node (k) having an incoming path associated with a node drop direction and an outgoing path associated with a node add direction: at a first node (q)

where q≠k of the BLSR, transmitting a first SONET formatted signal along the first transmission line, the first SONET formatted signal having a bandwidth K×BW; at each node (k) of the BLSR, receiving the first SONET formatted signal from the first transmission line, extracting same over a respective incoming path, and re-transmitting the first SONET formatted signal over a respective outgoing path back into the first transmission line; at each the node (k), inserting a respective outgoing SONET formatted signal into the second transmission line over the respective outgoing path, each outgoing SONET formatted signal comprising traffic formatted at a respective node (k), and having a bandwidth BW; and at each the node (k), extracting a respective incoming SONET formatted signal received from the second transmission line over the respective incoming path, each incoming SONET formatted signal comprising traffic addressed to the respective node (k), and having the bandwidth BW.

The invention further comprises a node for a SONET line switched ring comprising a first ring interface with a first working port for receiving an incoming optical signal OC-Mc from a working fiber associated with a first direction of transmission, and converting same into an incoming STS-Mc; a second ring interface with a second working port for converting an outgoing STS-Mc into an outgoing optical signal OC-Mc and transmitting same over the working fiber; an ATM cell management block for routing an output ATM cell extracted from the incoming STS-Mc as one of a drop ATM cell and a passthrough ATM cell, and multiplexing the passthrough ATM cell and an add ATM cell into the outgoing STS-Mc; and an STS management block for routing the incoming STS-Mc between the first ring interface and the ATM cell management block, and the outgoing SSMC between the ATM cell management block and the second ring interface.

The invention further comprises a node for a SONET line switched ring comprising a first ring interface with a first working port for receiving a SONET formatted incoming optical signal from a working fiber associated with a first direction of transmission, and converting same into an incoming non-ATM signal and an incoming ATM signal; a second ring interface with a second working port for converting an outgoing non-ATM signal and an outgoing ATM signal into an outgoing SONET formatted optical signal and transmitting same over the working fiber; an ATM cell management block for processing and transmitting an output ATM cell extracted from the incoming ATM signal as one of a drop ATM cell and a passthrough ATM cell, and multiplexing the passthrough ATM cell and an add ATM cell into the outgoing ATM signal; an STS management block for routing the incoming non-ATM signals as one of an output non-ATM signal and a passthrough non-ATM signal, routing the passthrough non-ATM signal and an input non-ATM signal as the outgoing non-ATM signal and routing the incoming and outgoing ATM signals between the first and the second ring interfaces and the ATM cell management block; and a non-ATM payload management for processing and transmitting the output non-ATM signal to a non-ATM port, and for processing and transmitting the outgoing non-ATM signal to the STS management block.

Advantageously, the ring according to this invention equals the bandwidth efficiency of a BLSR for homing traffic and provides SONET protection while overcoming cost concerns. A VP could burst up to a ring line rate N, whereas in a 2F-BLSR the burst rate would be limited to a STS-N/2 rate. In some cases, the unidirectional add/drop feature of the ring of the invention may offer twice the bandwidth for access rings, while offering protection for the traffic in the standard manner. Thus, if for example, a standard BLSR can carry a STM STS-6 in one direction and two ATM STS-3c in the other direction, the ring of the present invention can carry in addition two STS-3s of video, which travel in a drop-and-continue fashion.

Since the ring provides the same unidirectional traffic flow for both ATM and non-ATM traffic, traffic management commonality may be obtained.

Still another advantage of this new type of ring is that minimum changes to the BellCore GR-1230-CORE standard would be required to accommodate the ULSR APS protocol for protection of ATM traffic.

BRIEF DESCRIPTION OF THE DRAWINGS

The foregoing and other objects, features and advantages of the invention will be apparent from the following more particular description of the preferred embodiments, as illustrated in the appended drawings, where:

FIG. 4A is a block diagram of a 2F-BLSR in normal operation;

FIG. 4B is a block diagram of a 2F-BLSR showing protection actions during a cable cut;

DESCRIPTION OF THE PREFERRED EMBODIMENT

FIGS. 1, 2, 3A, 3B, 4A and 4B are provided for defining and illustrating some of the terms necessary for describing the present invention and its mode of operation.

Figure 1:
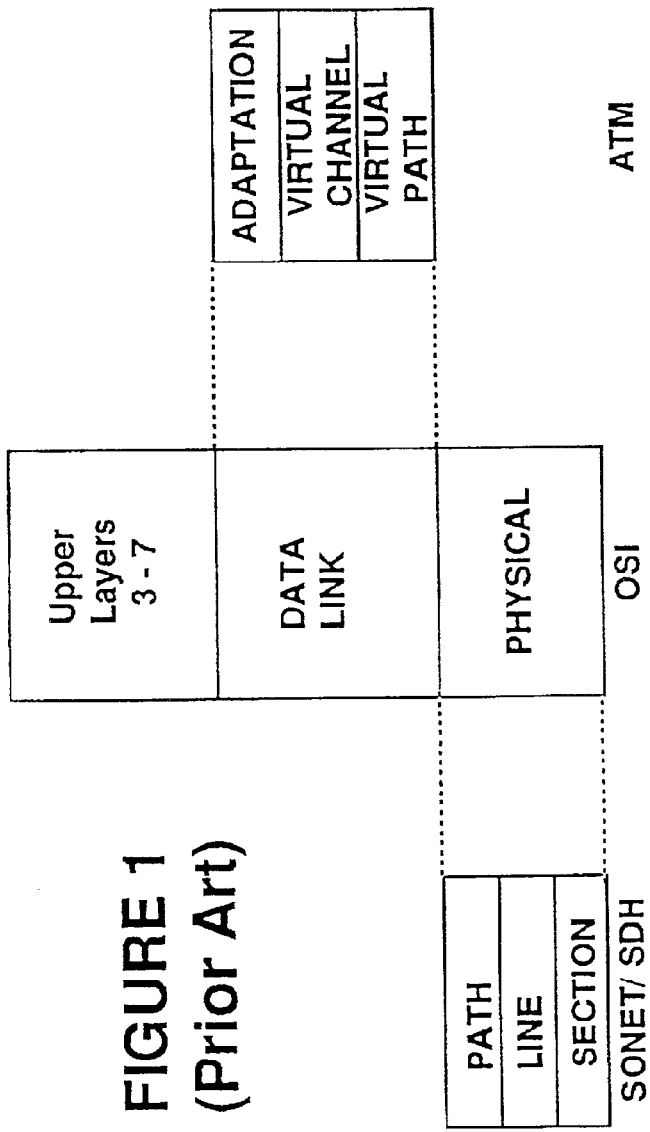
FIG. 1 illustrates the applicable OSI layers for ATM and SONET.

FIG. 1 shows the relationship between the ATM layer and the SONET physical layer. The physical layer for ATM can be made up of a SONET carrier and the ATM operations are transparent to SONET.

Figure 2A:
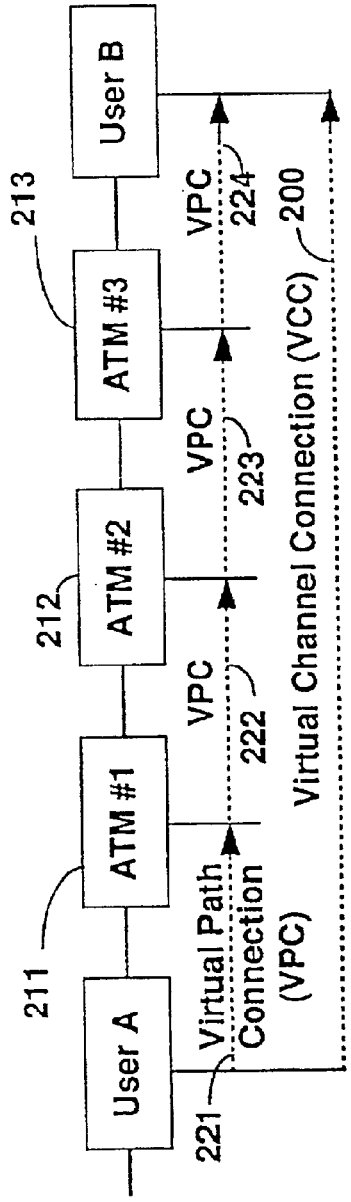
FIG. 2A shows a simple ATM configuration.

FIG. 2A shows a basic linear ATM configuration, illustrating a typical point-to-point ATM topology, where the connections are identified through virtual channel identifiers (VCI) and virtual path identifiers (VPI) in the ATM cell header. A virtual channel connection (VCC) 200 has end-to-end significance between end users A and B. Switching in the ATM network is illustrated at 211, 212, and 213. A virtual path connection (VPC) has significance between adjacent ATM devices, as illustrated at 221, 222, 223, and 224. From an input port, a cell with a given VPI/VCI is mapped to an output port and assigned a potentially different VPI/VCI.

Switching is performed very quickly through the use of a routing table. ATM switches are available today with a total switching capacity in the order of Gb/s. The virtual channels (VC) and virtual paths (VP) of ATM run on the SONET physical layer, as shown in FIG. 1.

Figure 2B:
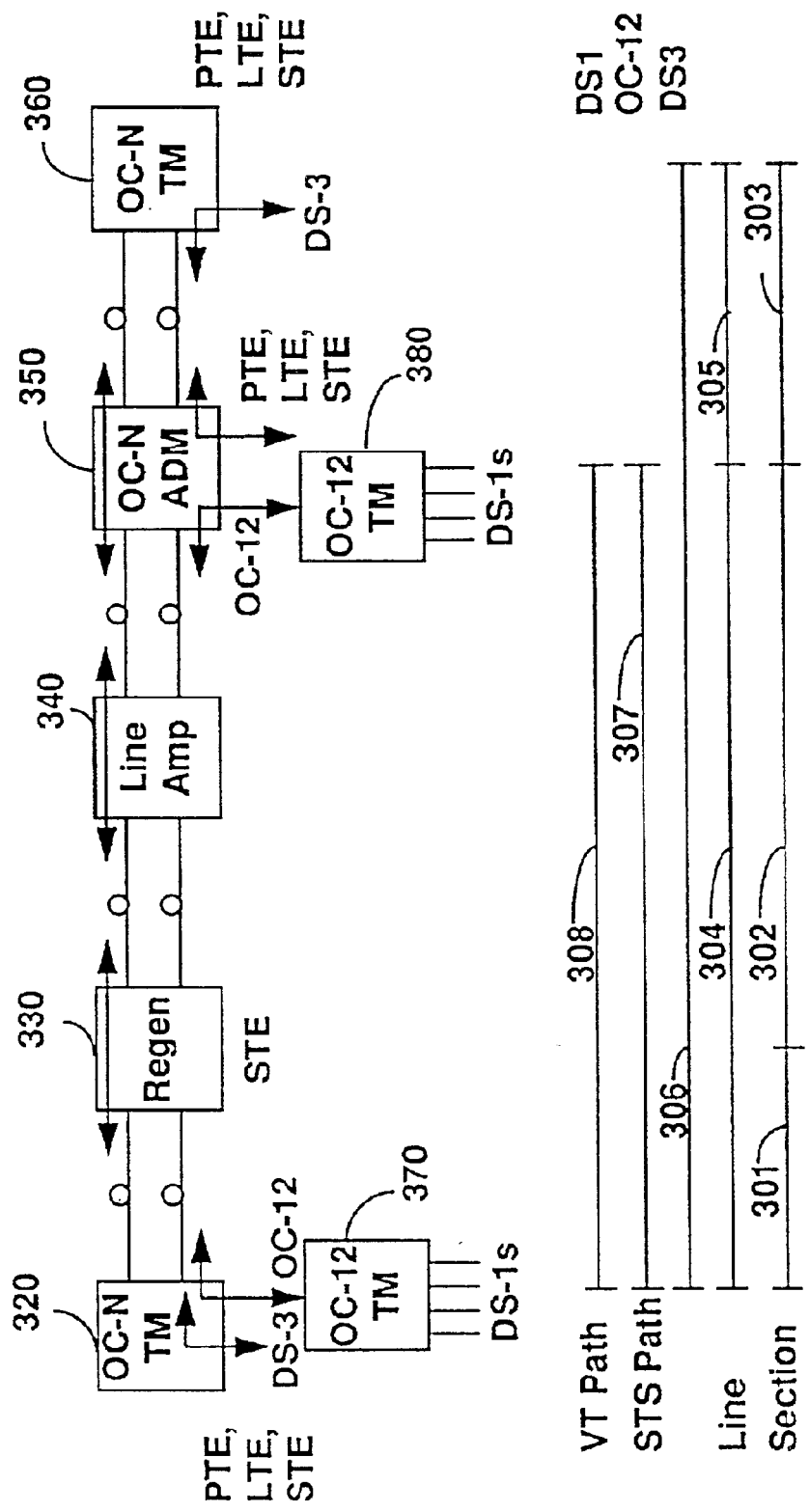
FIG. 2B shows a simple SONET configuration.

FIG. 2B shows a basic linear SONET configuration illustrating some SONET terms. The physical layer of SONET is modelled on three major entities: transmission path, multiplex section and regenerator section, each layer requiring the services of all lower layers to perform its own function. These layers correspond to SONET path, line and section layers shown in FIG. 1.

The section layer deals with the transport of multiplexed signals across a physical medium. A section is a portion of the transmission facility between two section terminating equipments (STE), such as regenerators and terminals. Functions include adding the section level overhead (SOH), framing, scrambling, section error monitoring and an embedded communication channel. FIG. 2B shows three sections, each defined between two successive STEs, namely, section 301 between terminal 320 and regenerator 330, section 302 between regenerator 330 and add-drop multiplexer 350, and section 303 between add-drop multiplexer 350 and terminal 360.

The line layer provides synchronization and multiplexing for the path layer. A line is a portion of the transmission facility between two consecutive line terminating equipments (LTE). The LTEs could be add-drop multiplexers or terminals (TM). An ADM can multiplex/demultiplex various inputs from an optical signal. It accesses signals that need to be dropped or inserted at that site, the rest of the traffic continuing straight through. FIG. 2B illustrates line 304 between terminal 320 and ADM 350, and line 305 between ADM 350 and terminal 360.

The path layer deals with the transport of services, such as DS1 or DS3, between path terminating equipments (PTE). The PTE could be ADMs or terminals serving routers, bridges, PBXs or switches. The main function of the path layer is to map the services and path overhead (POH) into STS-1s, which is the format required by the line layer. FIG. 2B shows a path 306 of a DS3 mapped STS-1 which originates at terminal 320 and is delivered at terminal 360. In another example, the circuit between terminals 320 and 350 transports an OC-12 signal, with DS-ls being added at nodes 370 and 380 to form the OC-12, in which case path 307 does not start or begin at nodes 320 and 350, but at nodes 370 and 380. The DS-1s are transported in VT1.5s from terminal 370 to terminal 380 on path 308.

A fourth layer, not illustrated, is the physical medium layer. It is the basic physical layer that provides optical transmission at a given bit rate. Issues dealt with at this layer include optical pulse shape, power levels, and wavelength. Electro-optical units communicate at this level.

In this specification, the term "normal operation-conditions" defines the operation of the ring of the present invention when the traffic between the ring nodes is directed along the working fiber and the protection fiber is idle, or used for lower priority extra-traffic (ET). The term "failure operation conditions" defines the operation of the ring when the connection between some ring nodes is interrupted due to a cable cut or a node failure. The terms "unidirectional" and "bidirectional" protection switching refer to modes of the protection protocol and should not be confused with the terms "unidirectional" and "bidirectional" connections. The term "transmission line" refers to the physical medium that connects two terminals, which is fiber optics in the following examples.

The term "line switched ring configuration" defines a ring where the protection switching is done at the SONET line level, while the term "path switched ring configuration" defines a ring where the protection switching is done at the SONET path level. These terms are explained next in further detail in connection with FIGS. 3A, 3B, 4A and 4B.

Figure 3A:
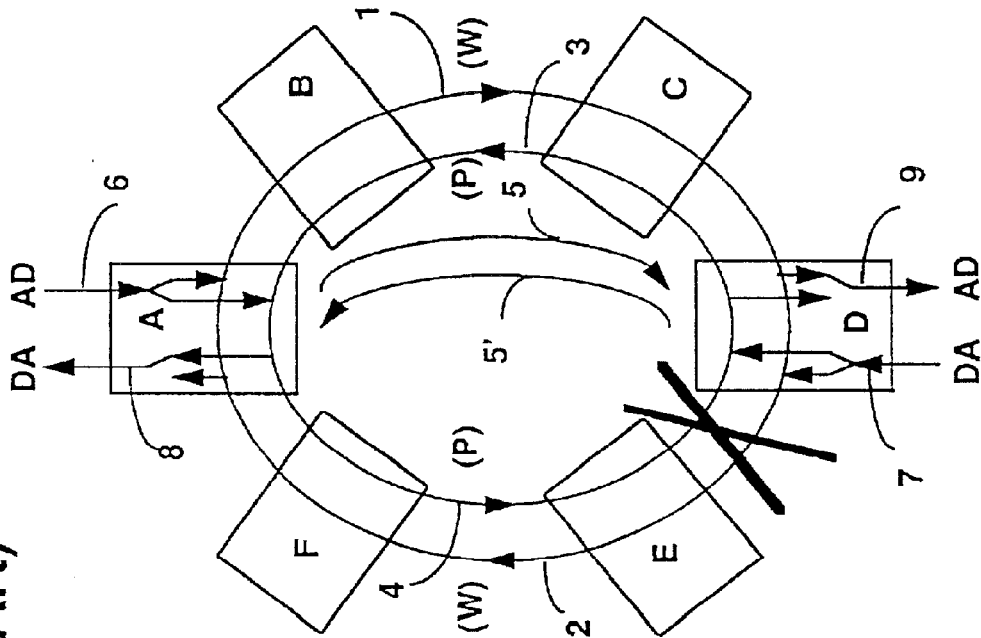
FIG. 3A is a block diagram of a unidirectional path switched ring (UPSR) in normal operation.
Figure 3B:
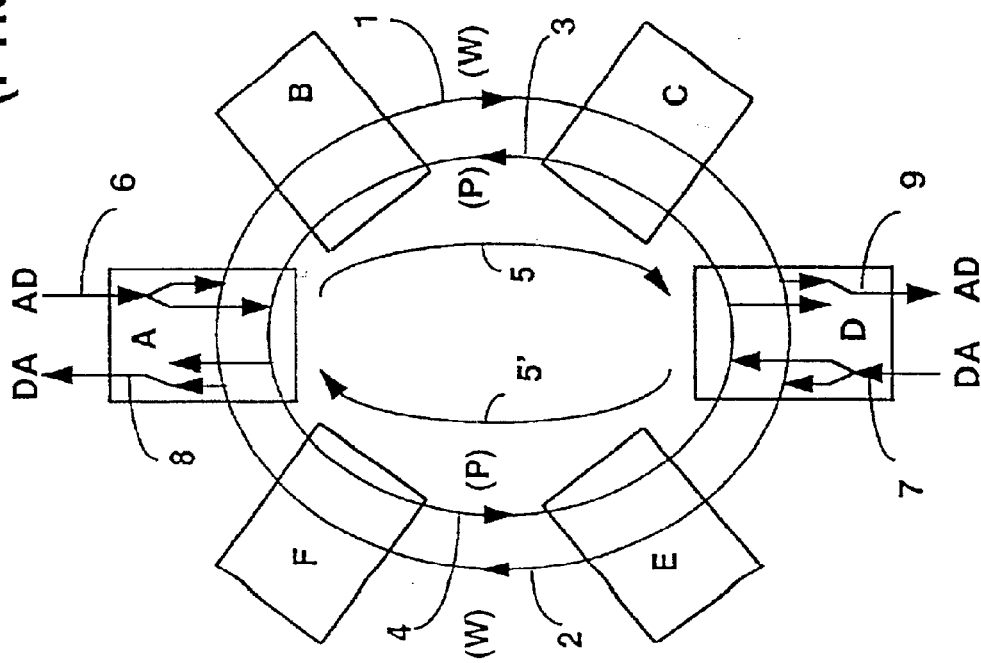
FIG. 3B is a block diagram of a UPSR showing protection actions during a cable cut.

FIGS. 3A and 3B illustrate an example of a UPSR with six nodes (PTEs) and FIGS. 4A and 4B shows a BLSR with six nodes (LTEs).

The UPSR shown in FIG. 3A interconnects ADMs A, B, C, D, E, and F along working fiber (W), in a clockwise direction, and ADMs A, F, E, D, C, and B along protection fiber (P) in a counterclockwise direction. The working fiber (W) between ADMs A and D has been denoted with numeral 1, while the working fiber between D and A has been denoted with 2. The protection fiber (P) between A and D is denoted with 4 and the protection fiber between D and A is denoted with 3.

The AD signal normally travels on working fiber 1 in the direction illustrated by arrow 5. The DA signal normally travels on working fiber 2 in the direction illustrated by arrow 5'. The ring provides a permanent head-end bridge at path layer for VTs and STSs, as illustrated at ADMs A and D by numerals 6 and 7. The switches at the tail-ends 8 and 9 are connected to the working fiber 2 and 1 respectively, such that the traffic AD from ADM A exits at ADM D and the traffic DA from ADM D exits at ADM A. Note that this is a bidirectional-connection, yet the traffic flow is unidirectional.

If fibers 2 and 4 are cut as shown in FIG. 3B, the traffic on working fiber 2 is interrupted. Switch 8 at ADM A switches to the protection fiber once ADM A determines that the signal on fiber 3 is of a better quality than the signal on working fiber 2. Now the traffic DA flows on protection fiber 3, as shown by arrow 5', and exits at ADM A through switch 8. Switch 9 at ADM D remains unchanged, and the traffic from ADM A to ADM D continues to flow along working fiber 1.

With this type of ring, the signal is always present on both working and protection fibers and no tail-to-head signaling is necessary; only tail-end switching is required. This results in fast switching times. A primary disadvantage of this type of ring, however, is that the protection fiber cannot be used to carry extra-traffic (ET).

FIG. 4A shows a two-fiber (2F) BLSR which is currently used in the backbone transport link. The ring nodes comprise line terminating equipment (LTE), and the switching is done at the line level. Since the ring is bidirectional, both fibers between the nodes are used for the working traffic. For a 2F-BLSR, the same fibers must also have protection capacity allocated within them.

Under normal conditions, shown in FIG. 4A, bidirectional traffic between ADMs A and D takes place in the working time-slots on fibers 2 and 4. Fibers 1 and 3 are also available for additional traffic between ADMs A and D. Node A and node D are connected to fiber 4 for transport of signals from A to D, and to fiber 2 for transport of signals from ADMs D to A, as shown by arrow 5.

FIG. 4B illustrates the case of a cable cut on fibers 2 and 4 between nodes E and D. In this case, the traffic AD/DA affected by the cable cut is redirected as described next. ADM D/E detects the line failure and begins protection signalling with ADM E/D on fibers 2-1 and 3-4. ADMs D and E are called the switching nodes.

The adding of traffic at A remains unchanged. The traffic from ADM A for D arrives at E in working time-slots on fiber 4. When node E detects the cable cut, it returns the traffic for node D towards node A in the protection time-slots on fiber 2 to be dropped at D from fiber 1. To this end, drop selector 9 at ADM D selects protection timeslots in fiber 1.

When node D detects the cable cut, the traffic added at D for A is redirected in the protection timeslots of fibers 34, until reaching node E, where it is looped back towards A in working time-slots on fiber 2. The dropping of traffic at A remains unchanged.

The passthrough traffic from ADM C towards ADM F travelling normally in the working timeslots on fibers 1 and 2, for example, is looped back at ADM D in fiber 3 protection timeslots. To this end, the switching node D connects working passthrough timeslots in fiber 1 to protection timeslots in fiber 3. Then, the looped back traffic arrives at switching node E in protection timeslots on fiber 4 where it is looped such that it is delivered to ADM F in working timeslots of fiber 2.

Thus, this type of ring provides for on-demand head-end bridge at the line layer, the tail-end selection depends on the head-end bridge, and there is tail-head signaling. The switching action only occurs at the nodes on either side of the fault, D and E in the example of FIG. 4B.

Since for a BLSR configuration the protection timeslots are only used during a protection switch, they can be used for lower priority ET.

Figure 5A:
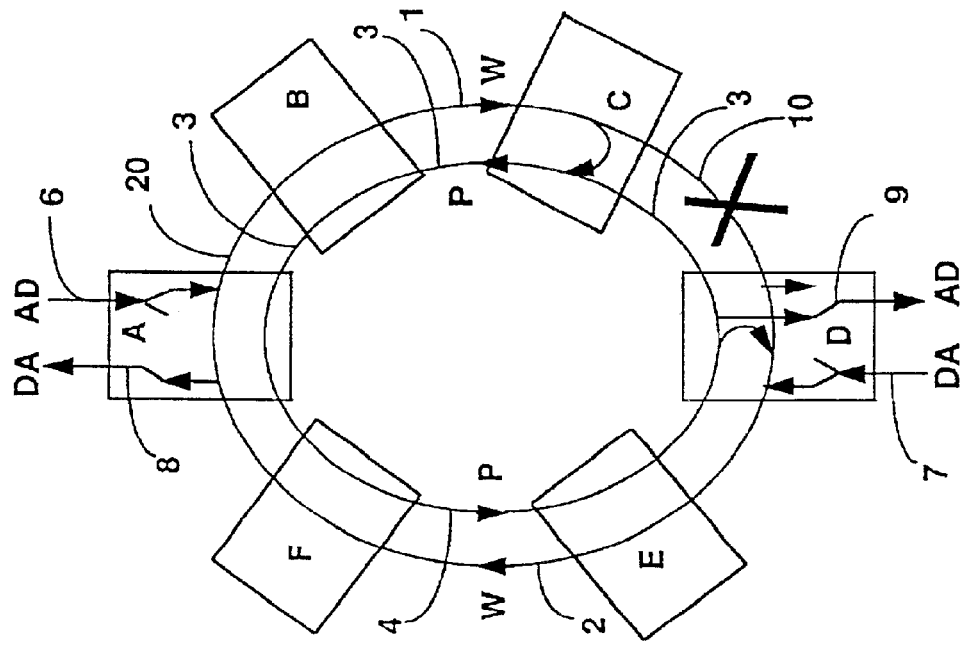
FIG. 5A is a block diagram of a unidirectional line switched ring (ULSR) of this invention, in normal operation.

FIG. 5A illustrates a ULSR according to this invention with six nodes A, B, C, D, E and F. The example shows traffic connectivity between nodes A and D under normal working conditions. Traffic added at node A and destined for node D flows clockwise (arrow 5) on the working fiber 1. The return path from node D to node A is in the same direction (arrow 5') on working fiber 2. The flow of traffic on the second fiber, the protection fiber, is in the opposite direction.

Figure 6A:
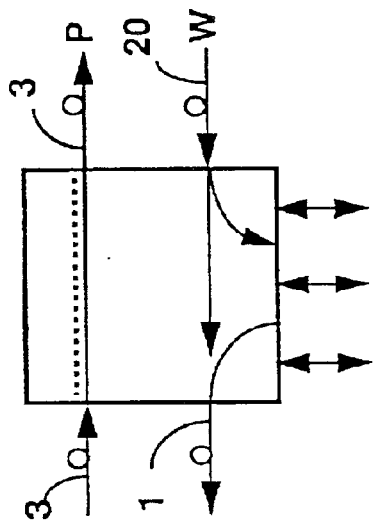
FIG. 6A shows a ULSR node in the idle state.

All nodes are in an idle state, as further illustrated in FIG. 6A for node A In this state, protection traffic is not established; fibers 3 and 4 are idle. Add traffic is inserted onto working fiber span 20 at node A, and the passthrough traffic is transferred from working fiber 2 onto working fiber 20. The drop traffic is selected at node A by drop selector 8 from working fiber 2.

It is apparent that the unidirectional traffic flow is similar to the working traffic flow in the UPSR illustrated in FIGS. 3A and 3B, except that there is no permanent protection bridge 6 or 7 at any node. Traffic is always added in the same direction and on the same fiber at the nodes illustrated FIGS. 5A and 5B.

Figure 5B:
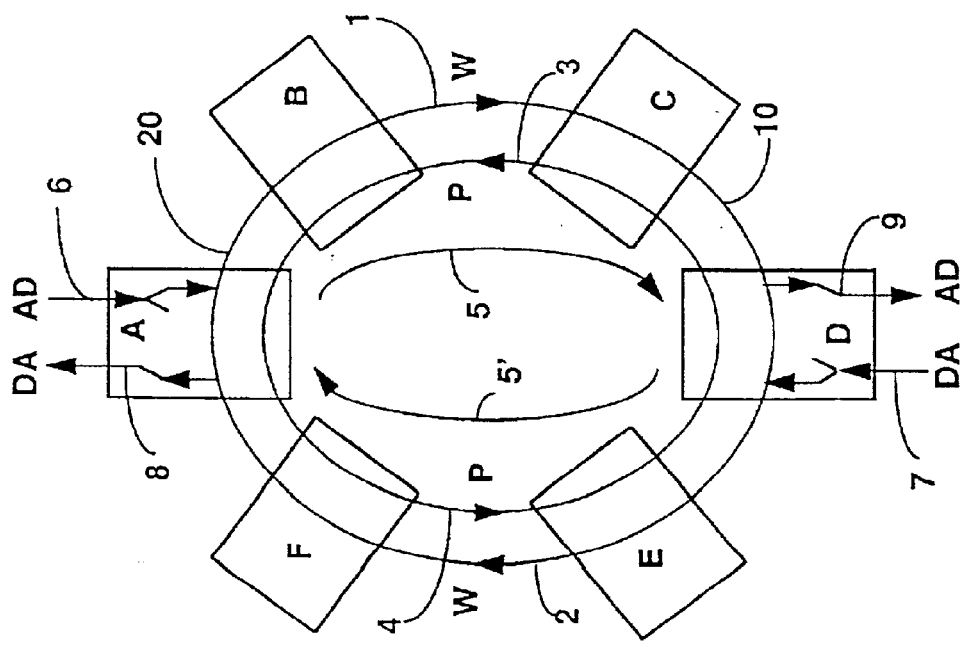
FIG. 5B is a block diagram of a ULSR showing protection actions during a cable cut.
Figure 6B:
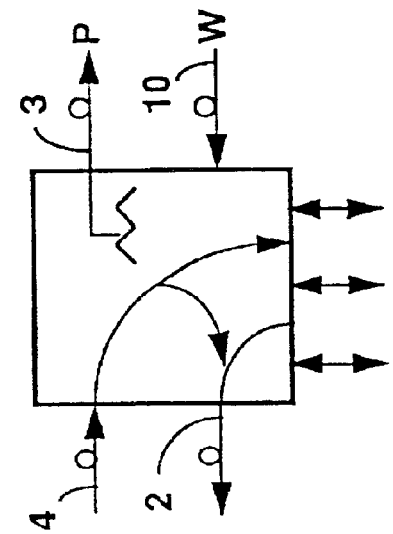
FIG. 6B shows a ULSR node in the passthrough and full passthrough state.
Figure 6C:
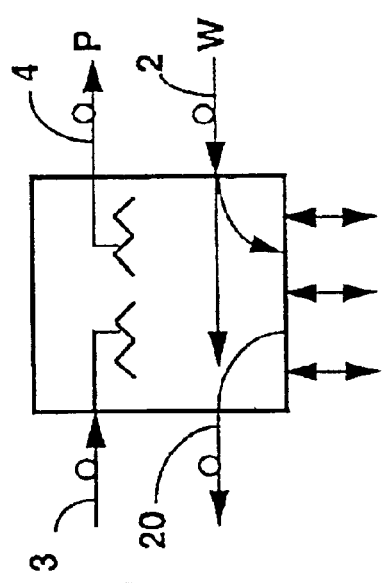
FIG. 6C shows a ULSR node in the bridged state.
Figure 6D:
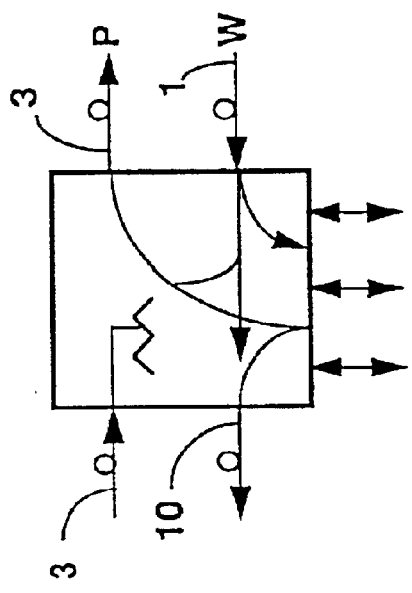
FIG. 6D shows a ULSR node in the switched state.
Figure 7:
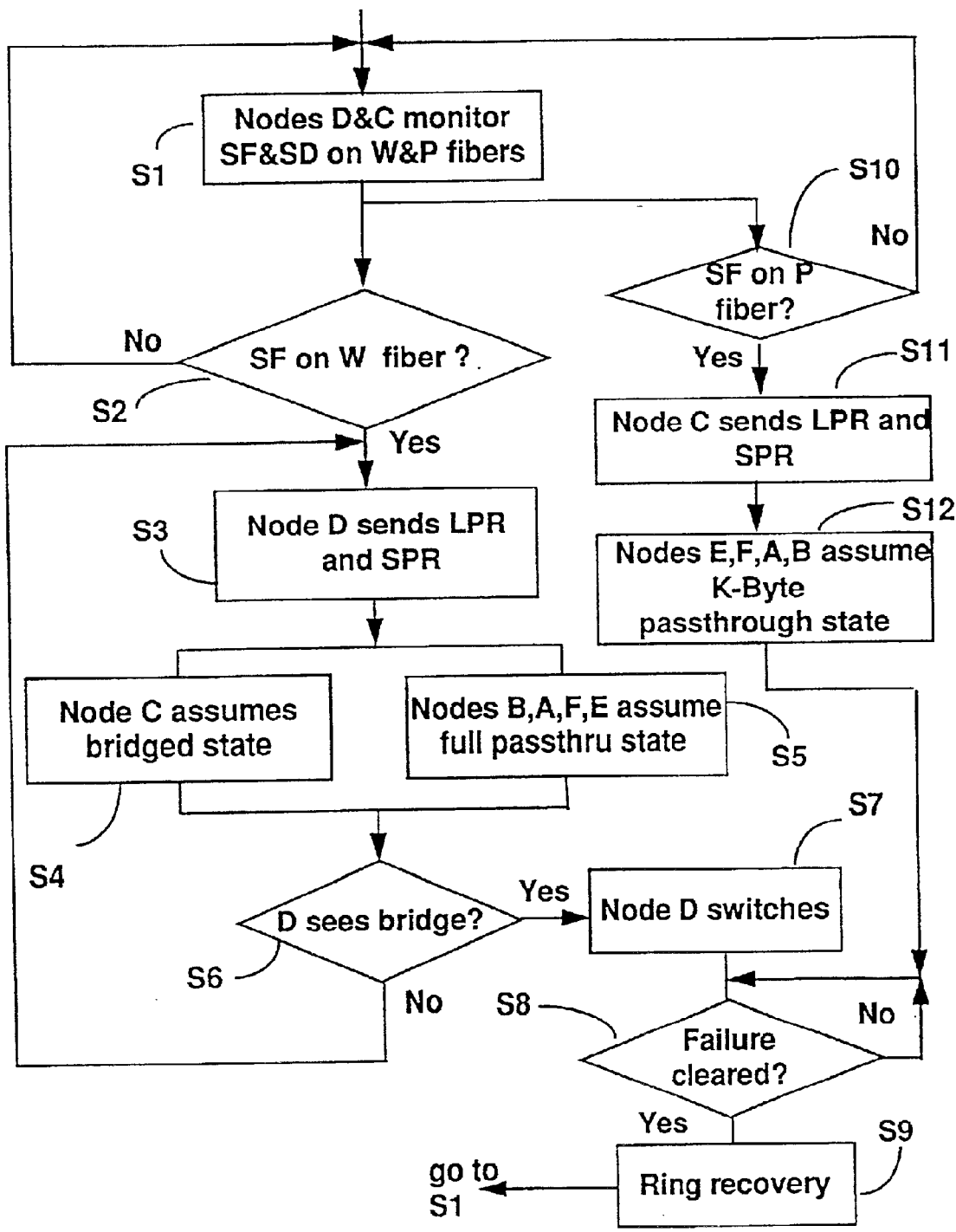
FIG. 7 is a flow-chart for operation of the ULSR ring when the working or/and protection fiber(s) is/are interrupted.

On the other hand, the node states of the ULSR of FIGS. 5A and 5B are similar to those of the BLSR of FIGS. 4A and 4B and the protection actions are similar, except that they are unidirectional. Thus, there is tail-to-head signaling to request a bridge, which also triggers the intermediate nodes to drop into passthrough state. In general, the tail must see the head-end bridge prior to switching. The switching nodes involved in bridging/switching are on either side of the fault, as disclosed next with reference to FIGS. 5B, 6A–6D and 7. At each node, the incoming signals on both the working and the protection fibers are monitored for detecting signal failure (SF) or signal degradation (SD). If fiber span 10 between nodes C and D is cut, as shown in FIG. 5B, node D will detect the absence of the respective incoming (W) signal. In the example of FIG. 7, nodes D and C monitor the respective incoming signal for detecting a signal failure in step S1. As indicated above, in case of a cable cut between nodes C and D, node D would initiate the "SF on W" branch in step S2, while node C would initiate the "SF on P" branch in step S10. Node D also establishes in steps S2 and S10 which fiber was affected, i.e. the working fiber 10, and/or the protection fiber 4. If working fiber 10 has been cut, node D requests in step S3 a bridge at node C by sending a long path request (LPR) on fiber 2 and a short path request (SPR) on fiber 3 around the ring.

When node C receives the long path request, it assumes a bridged state in step S4. FIG. 6C shows node C in the bridged state, where the node bridges its add traffic, normally sent towards node D on working fiber 10, onto the protection fiber 3 towards the destination node(s).

Node C also loops the passthrough traffic from working fiber 1 to protection fiber 3. Traffic destined to any of nodes B, A, F, or E, is looped at node D from protection fiber 4 and arrives at the destination node(s) on working fiber 2, 20. The node C drop traffic is not affected.

In step S5, intermediate nodes B, A, F and E assume a full-passthrough state when they see the LPR. FIG. 6B shows node B, for example, in a full passthrough state (solid lines), which is the mode of an intermediate node during a ring switch. In the full passthrough state, connection is established along the protection fiber 3 for accommodating protection traffic No extra traffic (ET) is possible in this state. No change occurs to working traffic flow, fibers 20 and 1.

If, in step S6, node D receives an APS indication that node C is in the bridged state, then node D assumes a switched state per step S7. FIG. 6D shows node D in the switched state. The traffic normally dropped from working fiber 10 is selected from the protection fiber 4. The passthrough traffic normally received from node C on working fiber 10 is also selected from the protection fiber 4 and directed on working fiber 2 towards the destination node(s) E, F, A, B. The add traffic is unaffected.

If the failure is cleared, as determined in step S8, all nodes return to the idle state in step S9.

The signaling between the ring nodes for the case where the error is of an SD type is similar to that above for an SF type.

If node C determines in step S10 that the interruption affects only the protection fiber 4, node C requests a K-byte passthrough state in step S11, and the intermediate nodes assume the K-byte passthrough state in step S12. This is a subset of the full passthrough state; the differences are illustrated in FIG. 6B by the dotted line. In this state, the K-bytes received on both working and protection fibers are propagated through the node. Although the K-bytes on the protection channel are passed through, extra traffic access is still available, which is different from the full pass-through state.

FIGS. 6A to 6D illustrate the various states of a ULSR node, which were described in connection with FIGS. 5A and 5B. FIG. 6A shows ring node A in the idle state, FIG. 6B shows ring node B in the passthrough or full passthrough state, FIG. 6C shows ring node C in the bridged state, and FIG. 6D shows ring node D in the switched state.

Since the ring of the invention has the similar bridging, passthrough, and switching functionality of a BLSR, a protection protocol similar to the GR-1230-CORE standard for a BLSR may be used, but without the rules associated with bidirectional actions and span switching.

The SONET APS bytes K1 and K2 are located in the line overhead (LOH) of the SONET frame, and are used for APS signaling between line level entities. These bytes are defined only for the first STS-1 of an STS-N signal.

The GR-1230-CORE BLSR K1–2 values can be modified for ULSR usage, as shown next. Tables 1 and 2 show the K-Bytes for these two types of rings, where the altered values are highlighted.

TABLE 1

K1 Assignment

| K1 bits | Value | Indication (BLSR) GR-1230 | Indication (ULSR) |
|---|---|---|---|
| 1–4 | 1111 | LP-S, SF-P | LK-P |
|  | 1110 | FS-S | SF-P |
|  | 1101 | FS-R | FS |
|  | 1100 | SF-S | — |
|  | 1011 | SF-R | SF-W |
|  | 1010 | SD-P | SD-P |
|  | 1001 | SD-S | — |
|  | 1000 | SD-R | SD-W |
|  | 0111 | MS-S | — |
|  | 0110 | MS-R | MS |
|  | 0101 |  | WTR |
|  | 0100 | EX-S | — |
|  | 0011 | EX-R | EX |
|  | 0010 | RR-S | — |
|  | 0001 | RR-R | — |
|  | 0000 | NR | NR |
| 5–8 |  | DESTINATION NODE ID |  |

As seen in Table 1, all the span codes (LP-S, FS-S, SF-S, SD-S, MS-S, EX-S) are eliminated. Lockout of protection is assigned highest priority followed by SF on protection; this is similar to linear APS. The reverse request codes (RR-S, RR-R) are eliminated.

TABLE 2

K2 Assignment

| K2 bits | Value | Indication (BLSR) GR-1230 | Indication (ULSR) |
|---|---|---|---|
| 1–4 |  | Source Node ID |  |
| 5 | 1 | Long Path | Long Path |
|  | 0 | Short Path | Short Path |
| 6–8 | 111 | L-AIS | L-AIS |
|  | 110 | L-RDI | L-RDI |
|  | 101 | — | — |
|  | 100 | — | — |
|  | 011 | ET | ET |
|  | 010 | Br & Sw | Switched |
|  | 001 | Bridged | Bridged |
|  | 000 | Idle | Idle |

It is seen in Table 2 that the Bridged & Switched code collapses to the Switched code.

Figure 8:
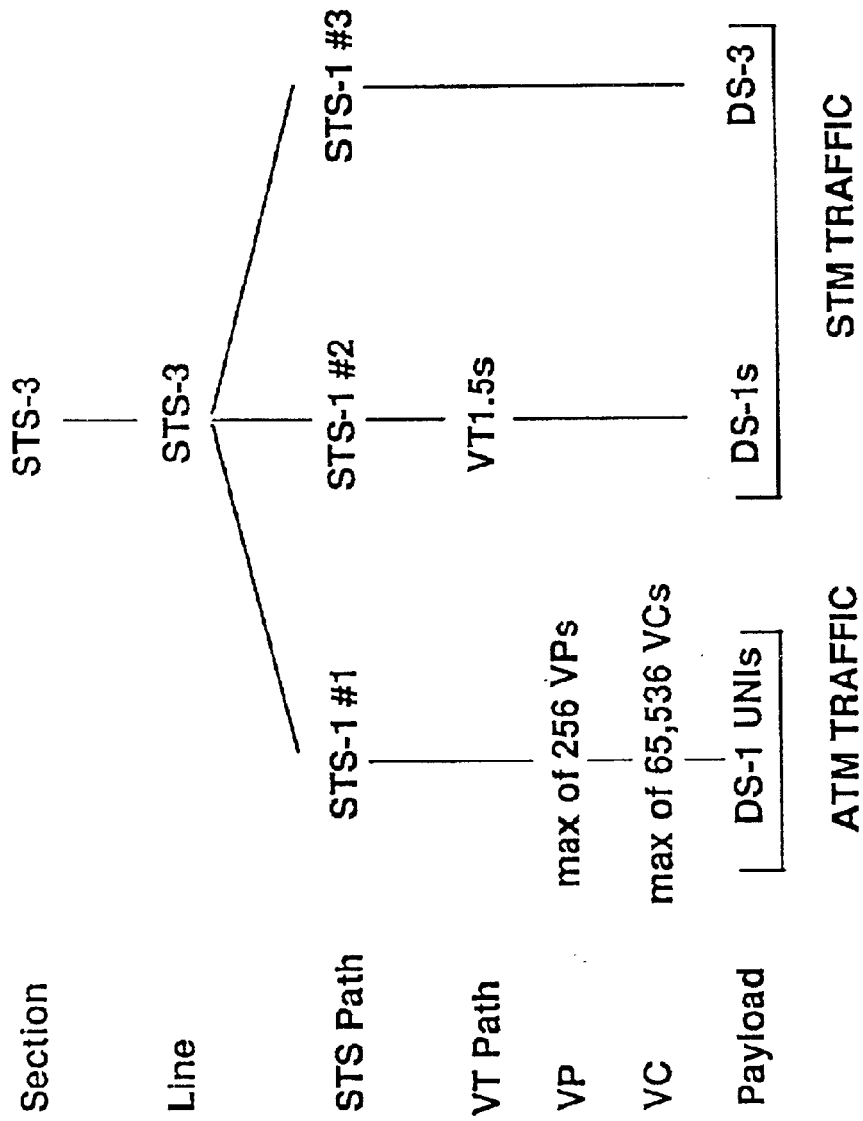
FIG. 8 illustrates an example of a STS-3c signal formed with mixed ATM and STM traffic.

FIG. 8 illustrates an example of an STS-3 signal formed with mixed ATM and non-ATM traffic. In this example, STS-1 #1 is an ATM mapped STS-1 which may carry up to 65,536 VCs. The ATM mapped STS-1 is protection switched per the ULSR scheme described above.

The second and third STS-Is of the FIG. 8 example carry non-ATM traffic with VT and STS-1 mapping, respectively. The UPSR protection protocol is used for the non-ATM traffic.

In another example, an OC-12 structure may be obtained with some STS-1s carrying STM traffic of VT/STS-1 mapping and with some ATM traffic in increments of STS-Is or STS-3cs.

Figure 9:
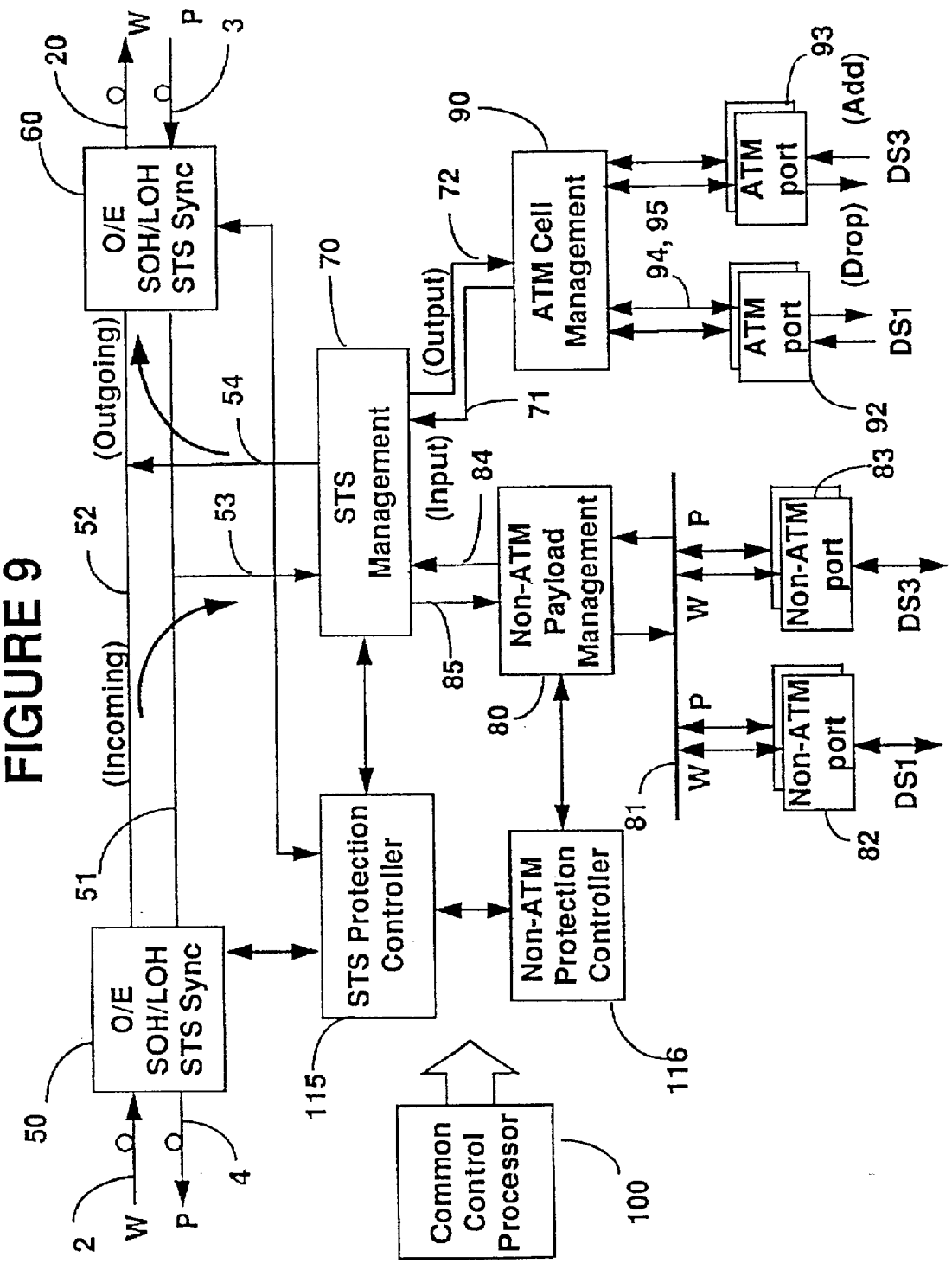
FIG. 9 illustrates a block diagram of a node according to this invention.

In general, the signal received/sent by a node from/to the ring is denoted in the following with STS-N. The non-ATM SONET-formatted signal is denoted with STS-W, comprising W×STS-1s. The ATM SONET formatted signal is denoted with STS-Mc, where M represents the number of STS-1s concatenated for transporting a cell-based payload. An STS-Mc according to this invention also represents ATM traffic formatted as m×STS-1s. It is to be understood that W+M=N, which is the bandwidth allocated to the respective node, and N, W and M are integers taking values 1, 2, 3, etc FIG. 9 illustrates a block diagram of node A of FIGS. 5A and 5B according to this invention.

The term "incoming" is used in the following to designate the traffic direction from the ring to node A, while the term "outgoing" is used to designate the traffic direction from the node to the ring. The term "add" designates the direction from the trib ports to the node, while "drop" defines the direction from the node to the trib ports.

O/E interface 50 comprises an input working port and an output protection port. The input working port converts an incoming SONET formatted optical signal OC-N, received on working fiber 2, to an incoming electrical signal on line 51. The output protection port converts an outgoing electrical signal on line 52 to an outgoing SONET formatted optical signal OC-N on protection fiber 4. O/E interface 60 comprises an output working port, and an input protection port. The output working port converts the outgoing electrical signal on line 52 to an outgoing optical signal on working fiber 20, while the input protection port at interface 60 converts an incoming optical signal received on fiber 3 to an incoming electrical signal on line 51.

Interfaces 50 and 60 perform SONET physical layer operations. With respect to the incoming working traffic, the input working ports at interfaces 50 and 60 are also responsible for descrambling the incoming signal, stripping the section overhead (SOH) and the line overhead (LOH), and transmitting the incoming non-ATM STS-1s and the ATM STS-Mc to an STS management block 70. The incoming APS bytes are detected and validated, and the K-bytes are provided to an STS protection controller block 115. The input working port also performs clock recovery and synchronization of the STS paths.

Since working port at the interface 50 accesses the LOH, it is responsible for detecting errors in the incoming signal and performing comparisons with a provisioned signal degrade threshold. Exceeding the threshold constitutes an SD in protection terminology. Also, each interface 50 and 60 is responsible for detecting when its partner port has failed due to an equipment failure, removal, power loss, or local microcontroller failure.

With respect to the outgoing working traffic, the output working port at interface 60 is responsible for receiving the outgoing STS-1s and STS-Mc from the STS management block 70, generating the LOH and SOH, scrambling and converting the electrical signal to an outgoing optical signal OC-N, and transmitting it on fiber 20. The output working port also performs clock synthesis, synchronization, and updates the outgoing APS bytes.

The input and output protection ports at interfaces 50 and 60 perform the same functions as above for the termination and generation of the protection channel.

STS management block 70 supervises the communication of the incoming and outgoing signals between node A and the ring, according to the traffic mode.

For the incoming direction, STS management block 70 receives the incoming signal from interface 50 or 60 and routes the output ATM mapped STS-Mc to an ATM cell management block 90. As well, block 70 delineates the non-ATM STS-1s from the STS-W and routes them to a non-ATM payload management block 80. STS management block 70 also passes through the traffic that is not addressed to node A. For the outgoing traffic, STS management block 70 receives and routes an input ATM mapped STS-Mc from the ATM cell management block 90, and/or an input VT/STS-1 structured payload from the non-ATM payload management block 80.

Block 70 is responsible for UPSR protection for the non-ATM STS-1s, and the ULSR protection for the STS-Mc, under control of a STS protection controller 115. Since protection switching at node A is unidirectional, block 70 routes the outgoing signal always on output line 54, and the incoming traffic is received always from line 53. Prior art BLSRs need a second input and output line, since the traffic in this case is inserted or received to/from both directions.

For the input direction, ATM cell management unit 90 multiplexes the input cells received from the ports 92, 93, generates the path overhead (POH) and assembles an ATM structured input STS Mc, which is presented to the STS management 70 on line 71. For the output direction, block 90 delineates the output cells from the incoming STS-Mc, terminates the POH, and routes the drop/passthrough cells, as will be described in further detail in connection with FIG. 10. The ATM cell management block 90 is interconnected with ATM ports 92, 93 in a star configuration.

ATM cell management block 90 also performs the protection for the ATM ports.

Non-ATM payload management block 80 may be for example a VT management block in the case of a VT/STS-1 structured payload. For the input direction, block 80 receives from bus 81 the add non-ATM traffic, such as VTs/STS-1s, generates the POH, maps the traffic into an input STS-1, and provides the non-ATM structured input payload to STS management block 70 on line 84, for routing to the ring. For the output direction, block 80 receives the non-ATM output ST-1s from STS management block 70 on line 85, strips the POH, and routes the drop traffic to the bus 81.

Block 80 provides the UPSR protection for VTs under the control of a non-ATM protection controller 116 and the protection for the non-ATM DS1s, and/or DS3s added/dropped at ports 82 and 83.

STS protection controller 115 bases its switching actions on the K-bytes passed from interfaces 50 and 60. Protection controller 115 manipulates the incoming and outgoing K-bytes and supervises the protection switching. For the non-ATM traffic, such as non-ATM STS-1s, it uses the UPSR protocol, and for the ATM traffic, such as the ATM STS-Mc, it uses the ULSR protocol. User protection commands, user provisioning and defaults are accepted by the STS protection controller. It also receives equipment status reports from blocks 50 and 60.

Setting the node into a bridged, switched or passthrough state according to the information in the K1 and K2 bytes of the incoming STS-Mc for ATM traffic takes place as disclosed in connection with FIGS. 5A and 5B. Thus, when node A assumes a switched state, the passthrough ATM traffic received from the protection fiber 3 are output onto the working fiber 20. The drop traffic is selected from the protection fiber 3 and the add traffic remains unaffected. In a bridged state, the passthrough ATM traffic is routed from the working fiber 2 onto protection fiber 4, the add traffic is bridged on protection fiber 4, and the drop traffic is selected from working fiber 2. In the full passthrough state, the passthrough cell mapped STS-Mcs are transported through the node from the protection fiber 3 to fiber 4, add traffic is still inserted on working fiber 20 and traffic is dropped from working fiber 2.

STS protection controller block 115 also performs protection switching for the STM STS-1s, according to the UPSR switching protocol illustrated in FIGS. 3A and 3B for the UPSR rings. STS protection controller block 115 also monitors the ATM trib ports 92, 93, to control ATM trib equipment protection.

Non-ATM protection controller unit 116 controls the UPSR bridge, switch, and passthrough functions for the non-ATM traffic (for example STM VTs) and tributary equipment protection for the ports 82, 83, which could be DS1/DS3 STM mappers.

The operation of the node is controlled by a common control processor, generally illustrated in FIG. 9 by reference numeral 100.

Figure 10:
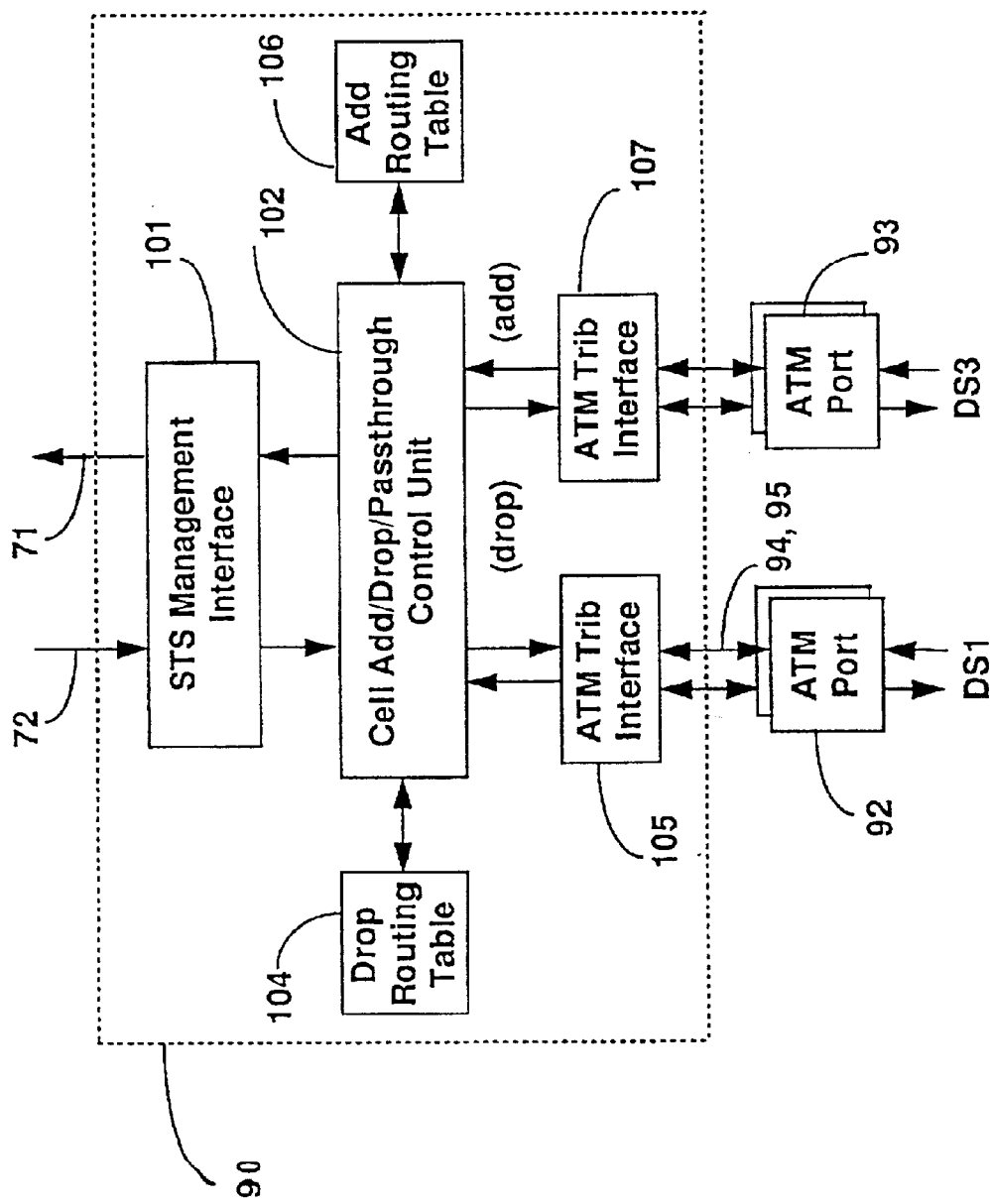
FIG. 10 is a block diagram of the ATM cell management block of the node illustrated in FIG. 9.

FIG. 10 illustrates in more detail the traffic routing between the ATM tribs and ATM cell management block 70. The architecture selected partitions the ATM layer cell add/drop/passthrough functionality, the trib physical medium dependent (PMD) and the transmission convergence (TC) sublayers to the ports.

ATM trib interfaces 105 and 107 perform some formatting to facilitate the hand-off between cell control unit 102 and trib units 92, 93, while STS management interface 101 performs formatting to facilitate the hands between cell control unit 102 and STS management block 70.

In the output direction, block 161 effects POH termination and cell delineation for the ATM STS-Mc, and transmits the output cells to cell control unit 102. Cell control unit 102 receives the output cells from block 101 and performs header inspection and address translation, if necessary, according to a routing table 104. Drop cells are sent to a trib interface 105 and/or 107, where they are formatted for handoff to the trib ports. Passthrough cells recognized within the output cells, are sent back to STS management interface 101 to form the input STS-Mc.

In the input direction, control unit 102 receives add cells from trib interface 105 and/or 107 and performs header inspection and address translation, if necessary, according to routing table 106. It then performs usage parameter control (UPC). Block 102 performs queue management of the input cell stream comprising add and passthrough cells, generates the POH and inserts the input cell stream into the input STS-Mc for hand-off to block 70, via block 101. It is apparent that block 102 has a much simplified design than needed for a bidirectional node, which require double bandwidth, overhead processing, buffering and table routing control.

Trib ports 92 and/or 93 receive a cell structured DS1 and/or DS3 in the add direction, and perform framing and clock recovery/synthesis. They then do cell delineation, and transmit the add cells to the cell management block 90. For the drop direction, the drop cells received from cell management block 90 are framed into a DS-n format and transmitted to the user.

Figure 11:
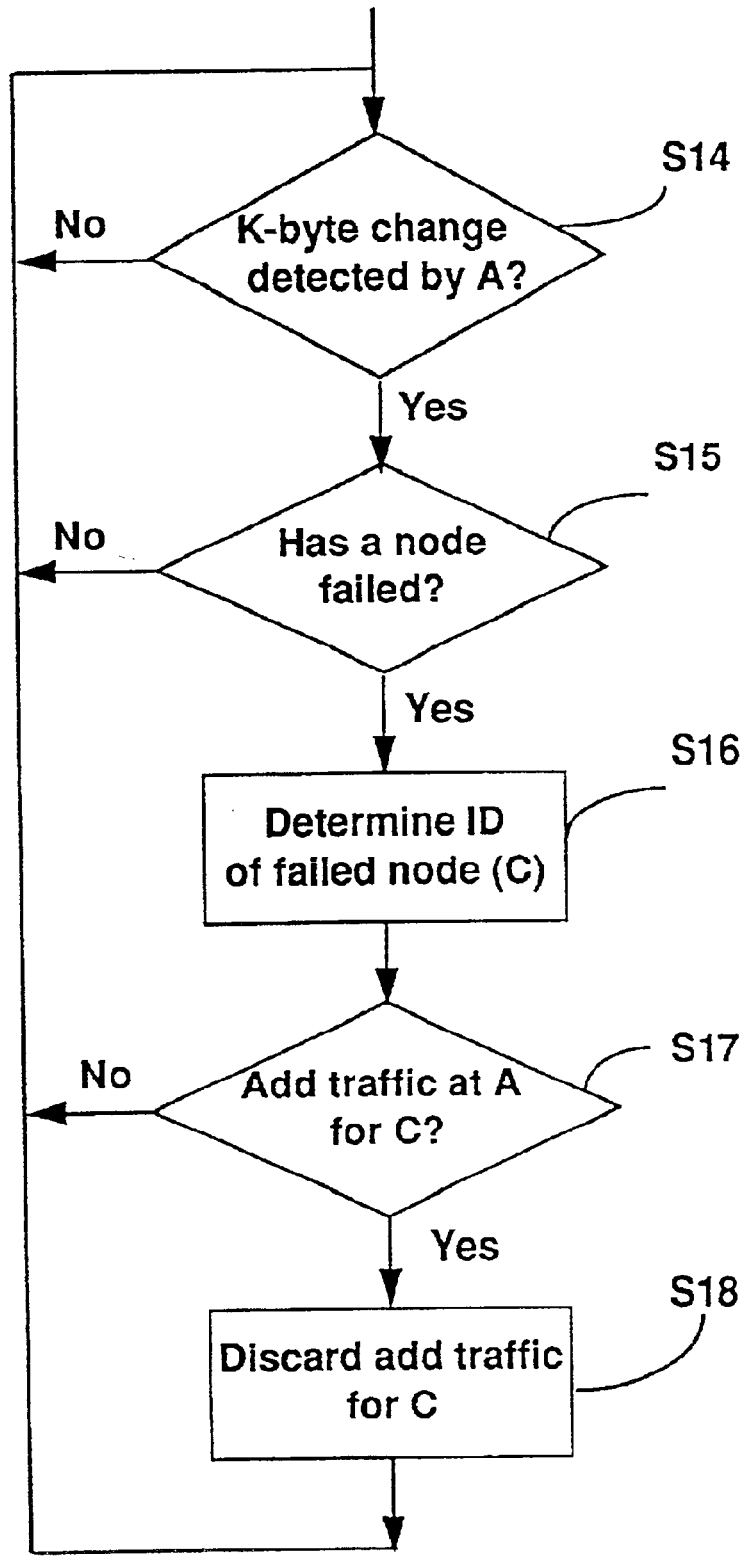
FIG. 11 is a flow-chart illustrating the squelching scheme for the switched ring of FIGS. 5A and 5B.

Squelching is performed by cell control unit 102. With a BLSR, there is the concern for misconnecting X to Y traffic under node failure or node isolation scenarios, due to the timeslot reuse capability. With a ULSR carrying ATM traffic, a similar concern exists if cells reuse the same VPI/VCI and a common node fails or is isolated. Similar to a BLSR, the ATM ULSR will combat this issue by squelching traffic destined for the failed node. Even if VPI/VCI reuse does not occur around the ATM ULSR, there is still a benefit in squelching traffic destined for a failed node. The squelching, or discarding of cells destined for a failed node at the point they would enter the ring, ensures bandwidth is not wasted that could be used by other ATM traffic. Note that this has no analogy for STM traffic on a BLSR, since all bandwidth is dedicated. The general goal discussed in GR-2837-CORE for removing isolated cells is enhanced and used for the ring of this invention. The specific mechanism consists of the actions illustrated in FIG. 11 and described next for node A of FIG. 5B.

In steps S14–S15, the STS protection controller block 115 determines whether or not a node has failed or has been isolated whenever K-byte changes occur. If so, the corresponding node identification (D) is found by comparing the node IDs in the new K-bytes with the ring node map, in step S16.

Next, the ID of the lost node is passed to the add interface 107 in step S17. Given the lost node ID, cell control unit can determine whether node A is adding cells with VPIs/VCIs associated with the lost node using routing table 106, which lists node IDs vs. terminating VPIs/VCIs. This is illustrated at step S17.

Locally added cells with VPIs/VCIs for the lost node are discarded by the cell control unit in step S18.

With this scheme, cells which have no place to go never enter the ring. This approach differs from the discussion in GR-2837-CORE, which does not appear to achieve the goal of freeing up as much ring bandwidth as possible. According to GR-2837-CORE, isolated cells are discarded only at the ring switching nodes, and therefore there would still be portions of the ring carrying isolated cells from the add node(s) to the switching nodes.

It is important to note that the ATM layer function of discarding incoming cells based on invalid VPI/VCI is a basic policing operation. Also, the SONET layer function of determining lost nodes is a basic protection function. The added functionality in the ring of the invention is the look-up table search of lost node ID vs. terminating VPIs/VCIs and the coordination of the existing functions mentioned.

Figure 12:
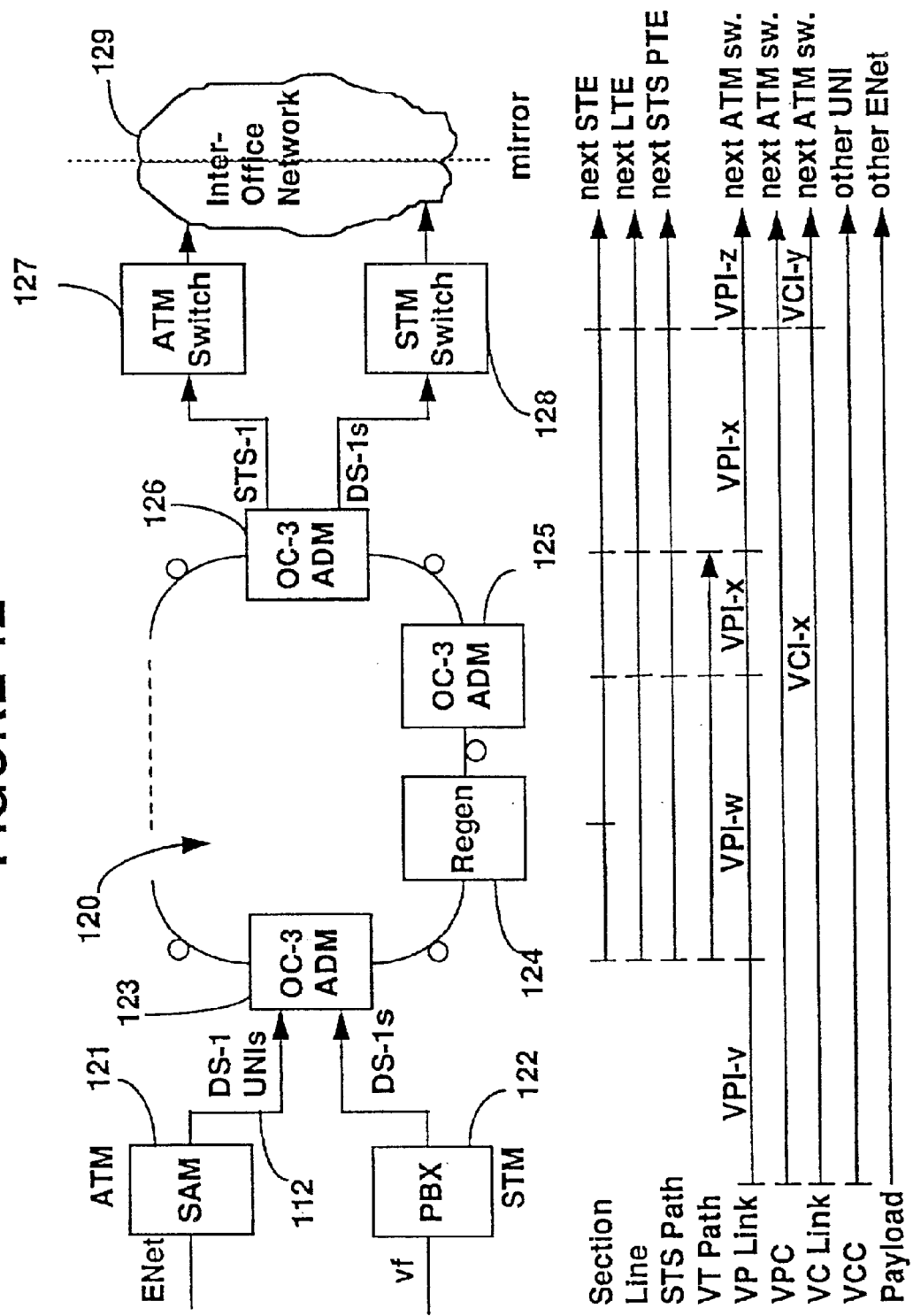
FIG. 12 shows an example of the ring of the invention connected in an access level transmission network.

FIG. 12 shows an example of a ring according to the invention. Service access multiplexer (SAM) 121 receives Ethernet traffic and adapts it into a DS1 ATM UNI. As well, SIM traffic, for example POTS signals at voice frequencies (vf), may be input to a private branch exchange (PBX) 122 to obtain a DS-1 trunk. The add/drop multiplexer (ADM) 123 constitutes a node in the ring 120 of the invention. Node 123 assembles the STM traffic into a VT1.5 and inserts it into STM STS-1#2, which travels around the ring. Similarly, the DS-1 UNIs received from the SAM 121 are assembled in the ATM STS-1#1.

Figure 13B:
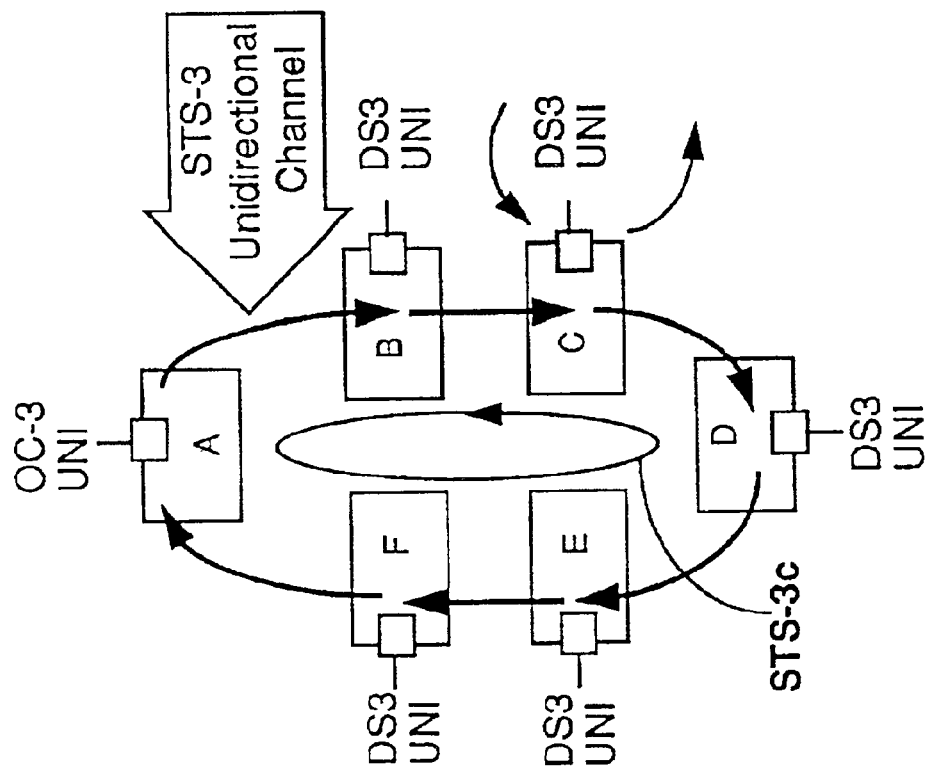
FIG. 13B shows the transport of ATM traffic on a unidirectional channel using the BLSR of FIG. 13A.
Figure 13A:
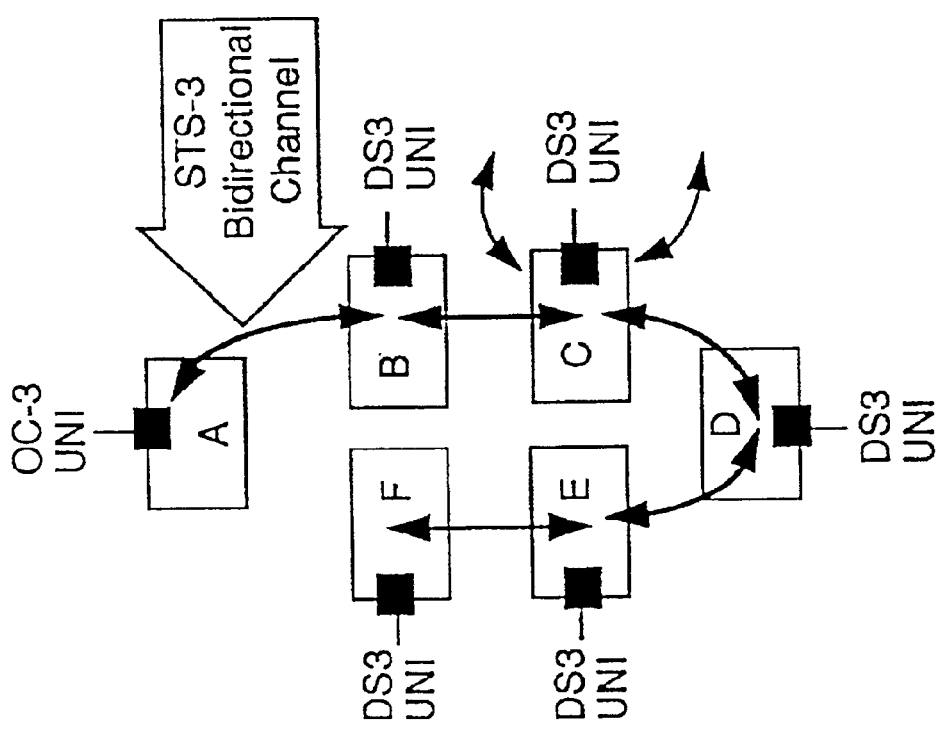
FIG. 13A shows the transport of ATM traffic according to this invention on a prior art BLSR.

FIG. 13A illustrates a 2F-BLSR in a configuration for homing traffic where add/drop is only performed on one side of each node. The ring is used to transport bidirectionally a STS-3. Each node adds/drops a DS3 in both directions, as shown by the arrows between the nodes, and as such the add/drop traffic is symmetrical. It is apparent that a bidirectional STS-3 is available between adjacent nodes.

FIG. 13B shows an application for providing a unidirectional path for a homing traffic with symmetrical add/drop at each node. It is apparent that a unidirectional STS-3 is available between all the nodes, which allows for an extra capacity of STS-3c in the opposite direction, as illustrated by the arrow in the ring, the traffic being still protected This extra capacity may be used for the same type of traffic, or for unidirectional broadcast, as for example for delivering TV programs.

While the invention has been described with reference to particular example embodiments, further modifications and improvements which will occur to those skilled in the art, may be made within the purview of the appended claims, without departing from the scope of the invention in its broader aspect.

What is claimed is:

1. A method for communicating information over a BLSR SONET line switched ring having a plurality of communication terminals connected over a first and a second transmission line, the method comprising the steps of:

at each terminal, inserting an outgoing signal onto said first transmission line along a first direction of transmission defined from said terminal towards the first adjacent terminal, inserting said outgoing signal onto said second transmission line along a second direction of transmission defined from said terminal towards a second adjacent terminal;

at each said terminal, receiving an incoming signal over said first transmission line from said first adjacent terminal, along said first direction of transmission, and from said second adjacent terminal along said second direction of transmission; and operating said plurality of communication terminals according to a unidirectional protection protocol upon detection of a failure condition in said incoming signal, wherein said incoming signal comprises an incoming non-ATM STS-W and an incoming ATM STS-Mc multiplexed in an incoming STS-N, and said outgoing signal comprises an outgoing non-ATM STS-W and an outgoing ATM STS-Mc, multiplexed in an outgoing STS-N, where M+W=N, and N, M, and W are integers indicative of the rates of said respective signals, wherein said unidirectional protection protocol operates according to a variant of a BellCore GR-1230-CORE standard.

2. A method as claimed in claim 1, wherein an incoming STM STS-W and an outgoing STM STS-W each comprises a plurality of virtual tributaries (VT).

3. A method as claimed in claim 1, wherein said incoming signal comprises only said STS-Mc and said outgoing signal comprises only said outgoing ATM STS-Mc; and wherein said unidirectional protection protocol operates according to a variant of a BellCore GR-1230-CORE standard, comprising unmodified assignments for all bytes of the transport overhead (TOH) field of said incoming signal, except for a modified assignment of bits 0–4 of the K1 byte, wherein a first span code is used for a lockout of protection code, a second span code FS-S is used for a signal fail on protection code, and third span codes, and reverse request codes are eliminated; and a modified assignment of bits 6–8 of the K2 byte, wherein the code "Bridges and Switched" is used for a code "Switch".

4. A method as claimed in claim 1, wherein said unidirectional protection protocol operates according to a Bellcore GR-230-CORE standard for said incoming and outgoing non-ATM STS-W and according to a variant of a BellCore GR-1400-CORE standard for said incoming and outgoing ATM STS-Mc, said variant comprising unmodified assignments for all bytes of the transport overhead (TOH) filed of said incoming signal, except for a modified assignment of bits 0–4 of the K1 byte, wherein a first span code is used for a lockout of protection code, a second span code FS-S is used for a signal fail on protection code, and third span codes (SF-S), (SD-S), and reverse request codes are eliminated; and a modified assignment of bits 6–8 of the K2 byte, wherein the code "Bridges and Switched" is used for a code "Switched".

\* \* \* \* \*